US006811700B2

(12) United States Patent
Austin et al.

(10) Patent No.: US 6,811,700 B2
(45) Date of Patent: Nov. 2, 2004

(54) INTEGRATED HYDROPONIC AND FIXED-FILM WASTEWATER TREATMENT SYSTEMS AND ASSOCIATED METHODS

(75) Inventors: David C. Austin, Taos, NM (US); David J. Maciolek, Ranchos de Taos, NM (US); Eric Lohan, Ranchos de Taos, NM (US)

(73) Assignee: Dharma Living Systems, Inc., Taos, NM (US)

( * ) Notice: Subject to any disclaimer, the term of this patent is extended or adjusted under 35 U.S.C. 154(b) by 109 days.

(21) Appl. No.: 10/294,450

(22) Filed: Nov. 14, 2002

(65) Prior Publication Data

US 2003/0111409 A1 Jun. 19, 2003

Related U.S. Application Data

(60) Provisional application No. 60/333,203, filed on Nov. 14, 2001.

(51) Int. Cl.[7] .................................................. C02F 3/00
(52) U.S. Cl. ...................... 210/602; 210/747; 210/151; 210/170; 210/194; 210/295
(58) Field of Search ................................ 210/602, 605, 210/747, 151, 170, 194, 196, 295

(56) References Cited

U.S. PATENT DOCUMENTS

| 681,884 | A | 9/1901 | Monjeau |
|---|---|---|---|
| 2,306,027 | A | 12/1942 | Swaney |
| 2,486,512 | A | 11/1949 | Armstrong |
| 2,822,329 | A | 2/1958 | Griffith |
| 3,385,786 | A | 5/1968 | Klock |
| 3,563,888 | A | 2/1971 | Klock |
| 3,598,726 | A | 8/1971 | Welch |
| 3,768,200 | A | 10/1973 | Klock |
| 3,770,623 | A | 11/1973 | Seidel |
| 3,925,206 | A | 12/1975 | Dea |
| 4,008,159 | A | 2/1977 | Besik |
| 4,057,933 | A | 11/1977 | Enyeart |
| 4,169,050 | A | 9/1979 | Serfling et al. |
| 4,267,038 | A | 5/1981 | Thompson |
| 4,277,342 | A | 7/1981 | Hayes et al. |

(List continued on next page.)

FOREIGN PATENT DOCUMENTS

| DE | 1916044 | 11/1969 |
|---|---|---|
| DE | 3941211 | 6/1991 |
| GB | 1 579 623 | 11/1980 |
| GB | 2 182 651 | 5/1987 |
| JP | 58-70891 | 4/1983 |
| SU | 1346588 | 10/1987 |
| WO | WO 95/17351 | 6/1995 |

OTHER PUBLICATIONS

Solar Aqua Sstyems, Inc. Marketing brochure, 1978.
Reed, Sherwood and Bastian, Robert, "Aquaculture Systems for Wastewater Treatment: An Engineering Assessment," U.S. Environmental Protection Agency Office of Water Program Operations Municipal Construction Division, 132 pages , Jun. 1980.

(List continued on next page.)

*Primary Examiner*—Robert A. Hopkins
(74) *Attorney, Agent, or Firm*—Allen, Dyer, Doppelt, Milbrath & Gilchrist, P.A.

(57) ABSTRACT

The wastewater treatment systems have a plurality of treatment modules between the inlet and the outlet, each for treating water with a selected process. Influent is directed to a fixed-film reactor. Water then flows to a hydroponic reactor, in which aquatic plants are suspended atop the liquid for achieving aquatic-root-zone treatment. A filtration device removes any remaining suspended solids following the hydroponic reactor. Recycling may occur to the fixed-film reactor to enhance nitrogen removal from one or both of the hydroponic reactor and the filtration device.

46 Claims, 3 Drawing Sheets

U.S. PATENT DOCUMENTS

| | | | |
|---|---|---|---|
| 4,284,508 A | 8/1981 | Jewell |
| 4,331,538 A | 5/1982 | Kickuth |
| 4,333,837 A | 6/1982 | Plósz et al. |
| 4,415,450 A | 11/1983 | Wolverton |
| 4,443,337 A | 4/1984 | Otani et al. |
| 4,482,458 A | 11/1984 | Rovel et al. |
| 4,620,931 A | 11/1986 | Hirata et al. |
| 4,678,582 A | 7/1987 | Lavigne |
| 4,793,929 A | 12/1988 | Kickuth et al. |
| 4,839,051 A | 6/1989 | Higa |
| 4,872,985 A | 10/1989 | Dinges |
| 4,895,645 A | 1/1990 | Zorich, Jr. |
| 4,904,386 A | 2/1990 | Kickuth |
| 4,921,604 A | 5/1990 | Moellenbeck |
| 4,959,084 A | 9/1990 | Wolverton et al. |
| 4,997,568 A | 3/1991 | Vandervelde et al. |
| 5,078,882 A | 1/1992 | Northrop |
| 5,087,353 A | 2/1992 | Todd et al. |
| 5,137,625 A | 8/1992 | Wolverton |
| 5,174,897 A | 12/1992 | Wengrzynek |
| 5,337,516 A | 8/1994 | Hondulas |
| 5,389,257 A | 2/1995 | Todd et al. |
| 5,486,291 A | 1/1996 | Todd et al. |
| 5,618,413 A | 4/1997 | Todd et al. |
| 5,733,453 A | 3/1998 | DeBusk |
| 5,766,474 A | 6/1998 | Smith et al. |
| 5,785,864 A | 7/1998 | Teran et al. |
| 5,863,433 A | 1/1999 | Behrends |
| 5,876,484 A | 3/1999 | Raskin et al. |
| 5,893,975 A | 4/1999 | Eifert |
| 5,897,777 A | 4/1999 | Zoeller et al. |
| 5,906,745 A | 5/1999 | Eto |
| 5,948,262 A | 9/1999 | Todd et al. |
| 5,951,866 A | 9/1999 | Grove et al. |
| 5,985,149 A | 11/1999 | Raetz et al. |
| 6,086,755 A | 7/2000 | Tepper |
| 6,090,294 A | 7/2000 | Teran et al. |
| 6,126,827 A | 10/2000 | Johnson, Jr. et al. |
| 6,159,371 A | 12/2000 | Dufay |
| 6,171,480 B1 | 1/2001 | Lee et al. |
| 6,200,469 B1 | 3/2001 | Wallace |
| 6,277,274 B1 | 8/2001 | Coffman |
| 6,406,627 B1 | 6/2002 | Wallace |
| 6,428,691 B1 * | 8/2002 | Wofford ..................... 210/151 |
| 6,447,681 B1 | 9/2002 | Carlberg et al. |
| 6,447,682 B1 | 9/2002 | Flowers |

OTHER PUBLICATIONS

Jewell, W. J. et al., "Wastewater Treatment with Plants in Nutrient Films," U. S. Environmental Protection Agency, EPA–600/S2–83–067, pps. 1–5, Oct. 1983.

Jewell, William J., "Anaerobic Sewage Treatment," Environmental Science & Technology, vol. 21, pps. 14–21, Jan. 1987.

Zhu, T. et al., "Phosphorous Sorption and Chemical Characteristics of Lightweight Aggregates (LWA) Potential Filter Media in Treatment Wetlands," Wat. Sci. Tech., vol. 35, No. 5, pps. 103–108, 1997.

Austin, David, "Final Report on The South Burlington, Vermont Advanced Ecologically Engineered System (AEES) for Wastewater Treatment," U.S. Environmental Protection Agency, pps. i–M2, Mar. 4, 2000.

* cited by examiner

INTEGRATED HYDROPONIC AND FIXED-FILM WASTEWATER TREATMENT SYSTEMS AND ASSOCIATED METHODS

CROSS-REFERENCE TO RELATED APPLICATION

This application claims priority to provisional application Serial No. 60/333,203, filed on Nov. 14, 2001, entitled "Integrated Hydroponic and Fixed-Film Wastewater Treatment Systems and Associated Methods."

BACKGROUND OF THE INVENTION

1. Field of the Invention

The present invention relates to wastewater treatment systems and methods, and, more particularly, to such systems and methods for wastewater treatment that are nonchemically based.

2. Description of Related Art

Wastewater treatment via "natural" means, i.e., without the addition of chemicals, has been accomplished with the use of aquatic and emergent macrophytes (plants) that, in concert with the attendant microorganisms and macroorganisms associated with macrophyte roots and stems, substantially mineralize biodegrade organic materials and substantially remove certain excess nutrients, such as nitrogen and, to a lesser extent, phosphorus. These macrophytes have typically been located in artificial marshlands, also known as constructed wetlands, which are designed for gravity flow. A negative aspect of such systems is that they are very land-intensive, requiring roughly on the order of 100 times as much land area as a conventional treatment plant, or, in terms of capacity, as much as 30–40 acres per $10^6$ gallons of wastewater treated per day unless other treatment processes are incorporated into the constructed wetlands Subsurface-flow wetlands, which comprise aquatic plants positioned above a gravel filter are also known for use in wastewater treatment. These systems have been shown to frequently fail, however. Failure is manifested as the upstream gravel tends to become clogged with biosolids, permitting the influent to bypass the clogged region and pass substantially untreated to a downstream region. Additionally, surfaced wastewater is a breeding ground for disease vectors and nuisance insects. Ultimately the gravel becomes so clogged that design wastewater treatment is substantially compromised. Plants also appear to have little treatment role in subsurface flow wetlands because the plant root systems are inhibited by conditions in the gravel filter from growing sufficiently long to extend into the gravel, and thus have minimal contact with the influent.

Several varieties of aquatic and emergent macrophytes are known to be used in wetland and aquatic wastewater treatment systems, including, but not limited to, cattails, bulrushes, sedges, and water hyacinths. In wetland treatment systems these plants may be packed in unlined or lined trenches or basins filled with a granular porous medium such as gravel or crushed stone. It has also been suggested to use recycled, shredded scrap tires in the place of the gravel. Another suggested wetland system variant is to place a semipermeable barrier between a lower level into which effluent enters and the plant root system for directing the waste waterflow across the entire plant bed.

In yet another variant floating aquatic macrophytes, typically water hyacinths, are placed in shallow lagoons where plant roots, with attendant microorganisms and macroorganisms, extending into the water column are a principal design treatment mechanism. Although this root zone treatment method can provide advanced secondary treatment effluent, its application is limited by climate to approximately 5% of the United States. The large treatment footprint of water hyacinth treatment systems prohibits enclosure in greenhouses for almost all economically viable applications.

It is also known to combine plant root zone treatment with conventional activated sludge technology. The principal advantages of combining root zone treatment with activated sludge are improved nutrient removal capability over root zone treatment alone and improved treatment stability in small, activated sludge treatment systems. Among the problems encountered with root zone/activated sludge technology is that the clarifiers employed do not scale well when the size of the system is reduced beyond a certain point. In addition, operator qualifications are high for activated sludge systems, adding to the expense of running the system. Root zone/activated sludge technology has been known to digest in situ a large fraction of the biosolids produced and maintained within the treatment system, thereby reducing system biosolids yield. The mechanism for yield reduction is thought to be the retention of biosolids flocs on plant roots with subsequent consumption and mineralization of flocs by the invertebrate community attendant to the root zone. Reduction of yield is desirable only to a certain point, however. As reactors in series are added, thereby increasing biosolids contact with the root zone, yield may be reduced to the point where an insufficient quantity of biosolids remain to be recycled from the clarifier to the reactors in series. Lack of recycled biosolids substantially degrades the treatment performance of the activated sludge treatment element. This design trap is inherent to root zone/activated sludge treatment systems. Preliminary studies have been performed on various aspects of the present invention by the inventors and other colleagues, as reported in "Final Report on the South Burlington, Vermont Advanced Ecologically Engineered System (AEES) for Wastewater Treatment," D. Austin et al., 2000; and "Parallel Performance Comparison between Aquatic Root Zone and Textile Medium Integrated Fixed Film Activated Sludge (IFFAS) Wastewater Treatment Systems," D. Austin, Water Environment Federation, 2001; both of these documents are incorporated herein by reference in their entirety.

SUMMARY OF THE INVENTION

The present invention provides a wastewater treatment system and method that are less land intensive than previous systems, as well as combining the advantages of a plurality of remediation techniques. The present invention has a smaller footprint than previously disclosed wetlands, reduces undesirable characteristics of an influent, and has a low yield, i.e., low proportion of matter needing disposal.

An additional feature of the invention provides a unified environment that includes a remediation system.

The wastewater treatment systems and methods of the present invention are amenable to the treatment of, for example, but not intended to be limited to, domestic wastewater, industrial waste or process water, stormwater, urban runoff, agricultural wastewater or runoff, and even biological sludges. The systems are capable of handling a flow range of approximately 2000–2,000,000 gal/day. The types of contaminants that can be treated in the system include suspended particles, nutrients, metals, simple organics (oxygen-demanding substances), and synthetic or complex organics. The undesirable characteristics typically desired to be remediated include, but are not intended to be limited to, average biological oxygen demand (BOD), average total suspended solids (TSS), total nitrogen, and concentration of oil and grease. The systems of the present invention can reduce BOD to <10 mg/L, TSS to <10 mg/L, and total nitrogen to <10 mg/L.

The water treatment system of the present invention comprises a wastewater inlet, a treated water outlet, and a plurality of treatment modules between the inlet and the outlet. Each module is for treating the water with a selected process. Each module is in fluid communication with at least one other module for permitting sequential treatment of the wastewater by a plurality of processes.

Influent wastewater is first directed to a a pretreatment process, such as covered anaerobic reactor or screening process, which serves to perform an initial organic and solids removal. A means is provided for removing odors from gases or fumes that are produced herein.

Following pretreatment for a predetermined period, the wastewater is channeled to a fixed-film reactor, which achieves removal of organics and solids and denitrification. This fixed-film reactor is characterized in a low yield unit process, in which yield is, defined as kilograms of VSS exiting the system divided by kilograms of BOD entering the system. In alternate embodiments of the system, plural fixed-film reactors may be provided in series.

A given fixed-film reactor may operate in a substantially aerobic or anoxic mode, or alternate between anoxic and aerobic modes. A given fixed film reactor may operate as a complete or partial mix bulk liquid reactor. Alternatively, the reactor may operate in a fill and drain mode.

Water exiting the fixed-film reactor then is pumped or flows by gravity to a hydroponic reactor, in which aquatic plants are suspended atop the liquid for achieving aquatic-root-zone treatment. The hydroponic reactor is substantially aerobic, and operates to achieve VSS digestion in addition to continued removal of nutrients started in the fixed-film reactor. The hydroponic reactor has an inlet and an outlet. Herein the term hydroponic reactor will be taken to comprise aerated reactors that have a rigid rack set at the water surface to support plants that send down roots into the wastewater column. The rack covers substantially the entire water surface. Plants substantially cover the surface of the rack. In alternate embodiments plural hydroponic reactors in series may be provided.

Digestion of VSS in the hydroponic reactors, or plurality of reactors, is designed to produce an hydroponic effluent VSS concentration of approximately 50 mg/L or less, which is sufficiently low to permit economically viable filtration. Filtration of hydroponic effluent to advanced standards may be achieved by a plurality of technologies.

Recycling may be directed to an anaerobic pretreatment module or to the fixed-film reactor, prior to channeling water exiting the hydroponic reactor to a filtering and disinfection module.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
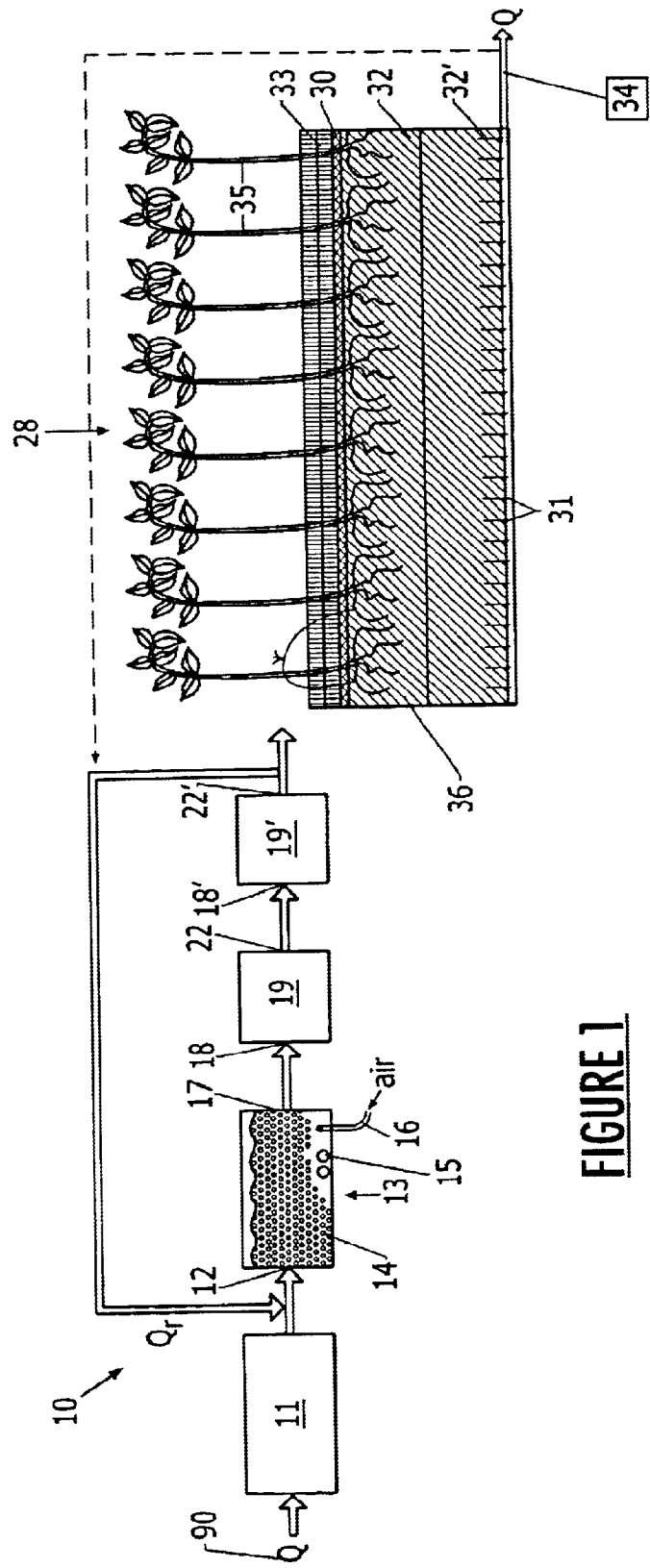
FIG. 1 is a schematic diagram of the first embodiment of the present invention.
Figure 2:
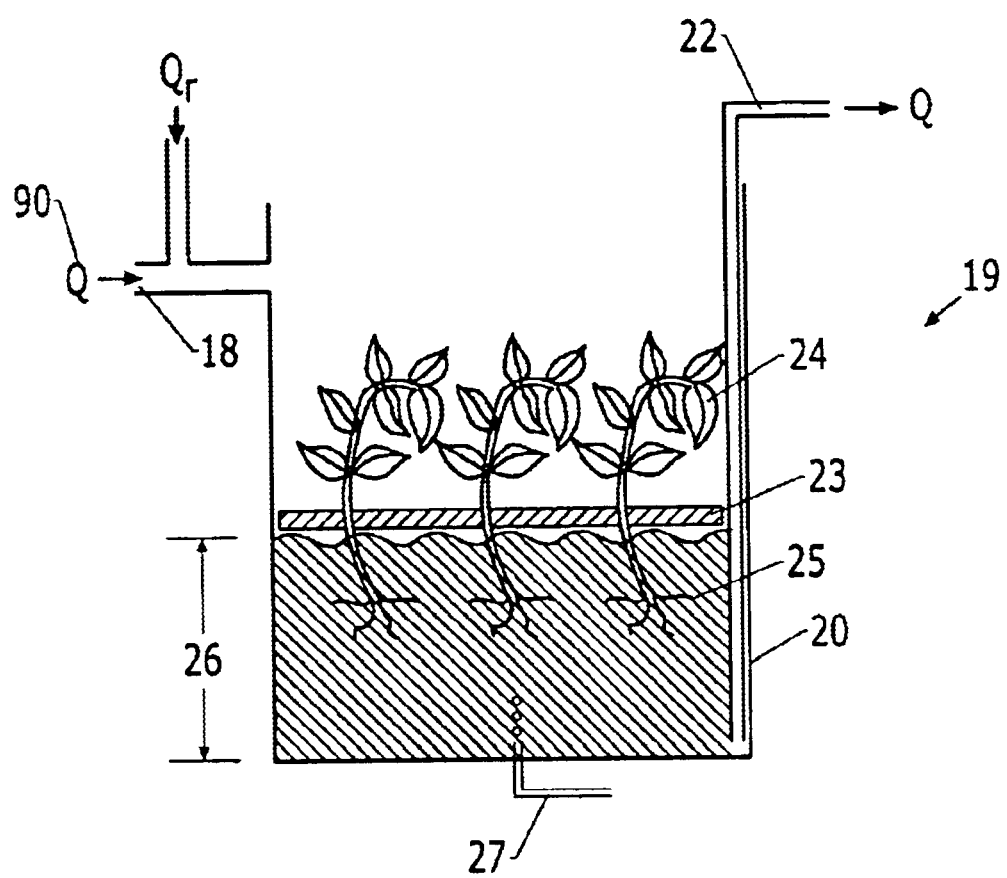
FIG. 2 is a side cross-sectional view of a hydroponic reactor.
Figure 3:
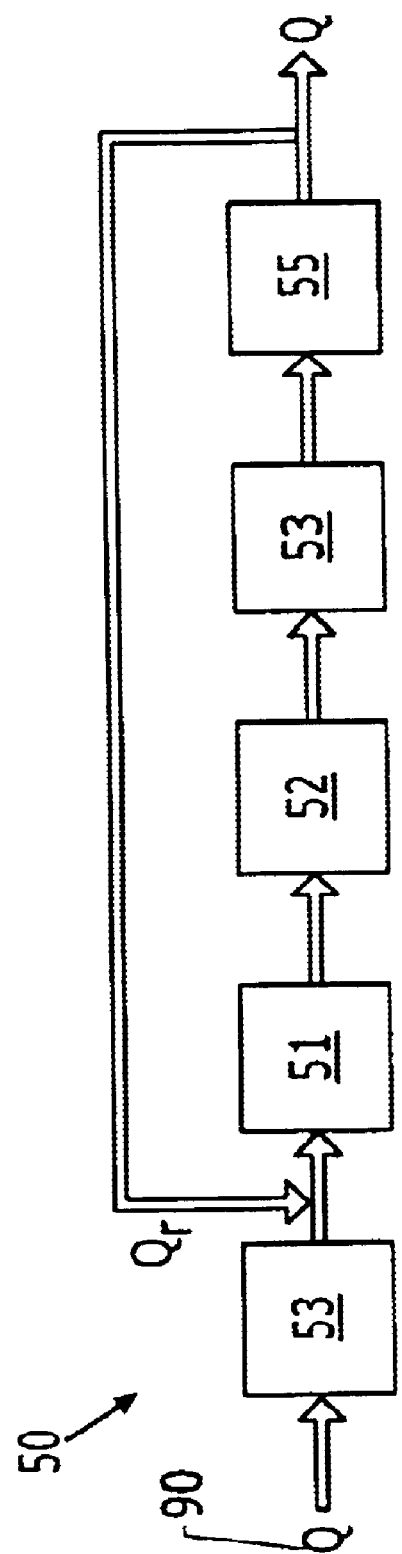
FIG. 3 is a schematic diagram of the second embodiment of the present invention.

A description of the preferred embodiments of the present invention will now be presented with reference to FIGS. 1–3.

A schematic of a first embodiment 10 of the present invention (FIG. 1) illustrates the flow of wastewater through the system, entering a pretreatment module 11, into which influent 90 is channeled and permitted to reside for a predetermined period. The pretreatment module 11 may comprise, for example, a covered anaerobic reactor, which serves to perform an initial organic and solids removal. In this vessel 11 the solids from the influent settle, and anaerobic bacteria feed on the solids and wastes in the liquid. A means is provided for removing odors from gases or fumes that are produced herein.

The wastewater 90 is then channeled to an inlet 12 of a fixed-film reactor, such as, but not intended to be limited to, a moving bed bioreactor (MBBR) 13, which as discussed previously achieves removal of organics and solids and denitrification. The fixed-film reactor 13 in this system 10 comprises a containment vessel that contains manufactured medium 14, which may be rigidly fixed, fluidized, or randomly packed. The medium 14 provides a large surface area that serves as a substrate for biofilm growth. Nitrification occurs in the biofilms growing on the fixed-film medium 14, and denitrification occurs during recycling to an anoxic environment or by inducing a transient anoxic condition within the reactor. Sloughing of biofilms in the fixed-film reactor 13 is substantially continuous, thereby eliminating the need for recycling biosolids as in prior known devices.

The fixed-film reactor 13 provides treatment stability early in the operational life of the system 10. Bacteria quickly colonize the media 14, providing effective BOD treatment as heterotrophic bacteria colonize media surfaces. Denitrification can be achieved, as will be discussed in the following, by recycling nitrified effluent to an anoxic or aerobic fixed-film process 13, thereby meeting design treatment goals prior to plant maturation in the hydroponic reactor 19 discussed in the following.

Mixing in the reactor 13, which may be effected by mechanical means, such as a propeller 15, or by aeration 16, is designed to ensure that wastewater 90 is exchanged over the entire medium surface area in a period that may range from minutes to several hours depending upon the characteristics of the reactor 13 and the medium 14. Preferably the mixing occurs substantially continuously during the operation of the system 10.

Following flow through the fixed-film reactor 13, water is channeled from an outlet 17 of the fixed-film reactor 13 to an inlet 18 of a first hydroponic reactor 19 (FIG. 2). A hydroponic reactor 19 herein is intended to comprise a basin 20 having the inlet 18 and an outlet 22. A rack 23 is positionable at the water's surface in the basin 20 and is adapted for supporting plants 24 thereon. Preferably the rack 23 covers substantially the entire surface of the basin 20, and plants 24 cover substantially the entire rack 23.

The role of plant roots 25 has been determined to be extremely important in the remediation processes of the present system 10 and its alternate embodiments. Plant roots 25 retain significant quantities of biosolids, also known as volatile suspended solids (VSS). Retention of biosolids on plant roots is a key mechanism of the digestion of biosolids within the hydroponic reactor. The aquatic root zone achieves simultaneous nitrification and denitrification. Significant nitrification occurs when nitrifying biosolids are retained on the plant roots 25. Denitrification occurs in localized, transient anoxic sites within the root zone. Further, overall reaction rates are higher than in pure aquatic-root-zone treatment. Since the system 10 does not employ a clarifier, as in prior known systems, capital and operating expenses and time are significantly reduced.

Treatment basin 20 depth 26 in relation to average root depth has a significant effect on treatment performance. At least a 20% penetration of the treatment water column 26 by root mass is believed preferable. As a number of plant species have been found that can reliably produce roots 2 feet in length, a maximum design depth 26 of approximately 6 to 7 feet is feasible for the current system 10.

Aeration and/or other means for imparting mechanical energy 27 is important, for mixing the contents of the reactor 13 and for forcing contact between the wastewater and the plant roots 25, ensuring that the plant root zone significantly contributes to treatment. Mixing force should not, however, be so robust as to cause the roots to splay outward, thereby decreasing exposed root surface area.

Time spent in the hydroponic reactor 19 should be sufficient to digest volatile organic material present in the wastewater and bacterial biomass generated in the system 10.

The yield from the system 10 is very low, since two reactor types 13,19 having intrinsically low yields are combined. Values less than 0.1 kg effluent VSS/kg influent $BOD_5$ are achievable with the present system 10.

In a particular embodiment, the fixed-film reactor 13 is embedded into the hydroponic reactor 19; however, this is not intended as a limitation, and the principle of having the reactors 13,19 in series obtains in any physical arrangement of this system 10, as schematically illustrated in FIG. 1.

In the embodiment shown in FIG. 1, a second hydroponic reactor 19' follows the first 19 in series. Alternatively, one very long hydroponic reactor may also be contemplated.

Recirculation $Q_r$ comprises an important feature of the system 10 design. Recirculation may be achieved by any pumping means known in the art, and is preferably at least equal to the forward flow rate, and may be up to ten times the forward flow rate. In the embodiment of FIG. 1, recirculation occurs following the second hydroponic reactor 19'.

In an alternate embodiment, the hydroponic reactor 19 is substantially toroidal, with a central cylindrical module comprising the fixed-film reactor 13. One of skill in the art will recognize that other configurations are also feasible.

This system 10 offers improvements to prior art technologies: By integrating a high-rate fixed-film treatment 13 into an aquatic-root-zone 19 treatment system, the advantages of the combined technologies are retained while substantially eliminating the drawbacks. The improvements include that the fixed-film component 13 provides treatment stability early during start-up of the system 10. Bacteria colonize the medium 14 quickly in the fixed-film reactor(s) 13, providing effective BOD treatment as heterophilic bacteria colonize medium 14 surfaces, and then nitrification as the nitrifying bacteria colonize medium 14 surfaces.

The elimination of the clarifier comprises an elimination of what has been heretofore considered a fundamental unit process. Elimination of the clarifier is made possible by the extremely small yield of the present system 10 while maintaining the biological nutrient removal treatment capacity found in clarifier-based treatment technology. For the purposed of filtration, the term "low yield" is defined as the production of effluent VSS concentrations <50 mg/L without accumulation of VSS elsewhere in the system 10. At these VSS concentrations, several filtration technologies can effectively replace the clarifier, with a filter 28 following the second hydroponic reactor 19'. Filtered effluent can be designed to produce TSS values <5 mg/L from a filter influent of VSS of 50 mg/L. Filtrate from such a filtration system 28 can effectively be processed on site in most treatment applications. Recycling may also occur following the filtration system 28 (dotted line in FIG. 1) in an alternate embodiment.

One embodiment of a filtration system comprises a vertical flow wetland 28, which includes a basin 30 having an outlet 31 in a bottom thereof. The basin 30 is adapted to contain a particulate medium 32,32', and a mat 33 adapted for permitting plants 35 to root 36 therein. The mat 33 is positioned above the particulate medium 32. The wetland cell 28 is adapted to maintain a population of aquatic invertebrates therein.

This system 10 is capable of achieving an ammonia concentration of <1 mg/L. A redox (oxidation reduction potential) probe 34 may be employed to regulate pumping. If the redox level is greater than a predetermined limit, the pump is turned off. Pumping only occurs as long as the system is anoxic. Alternatively, the wetland cell may fill and draw per other means of control such as a timer, programmable logic controller, or an on-line monitoring technology other than a redox probe. The system 10 is capable of producing an effluent having a BOD <5 mg/L, TSS <5 mg/L, total nitrogen <10 mg/L, and turbulence <5 ntu's.

Another advantage of this system 10 is its aesthetic features. In use, the reactors 13,19 appear to be planters filled with beautiful plants, and the sound of flowing water is known to have beneficial effects to the human psyche.

A second embodiment of the wastewater treatment system 50 is illustrated schematically in FIG. 3. This system 50 is also modular, and contains a first 51 and a second 52 fixed-film reactor such as the reactor 13 described above, connected in series, following the pretreatment vessel 53. In this configuration the first fixed-film reactor 51 remains in a substantially anoxic condition, while the second 52 remains in a substantially aerobic condition.

At least one hydroponic reactor 54 follows the second fixed-film reactor 52, and is substantially the same as that 19 described above. Following aquatic-root-zone treatment, a filtration system 55 removes any remaining suspended solids. Recycling for denitrification follows the filtration system 55 to the first fixed-film reactor 51.

Another aspect of the present invention includes a method of designing a site-specific wastewater treatment system. The method comprising the step of determining parameters of wastewater at a site. Such parameters may include, but are not intended to be limited to, measured levels of wastewater characteristics and temporal ranges thereof. One of skill in the art will recognize that flow rate, volume, nutrient level, BOD, TSS, and VSS may be included in such a set of parameters.

Owing to the modular nature of the systems 10,50 of the present invention, a wastewater treatment system can then be configured that is specific to the determined wastewater parameters.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A wastewater treatment system comprising:
   a fixed-film reactor having an inlet for receiving wastewater to be treated and an outlet, the fixed-film reactor comprising a vessel adapted for holding media therein and means for mixing contents of the vessel, the media adapted to support biofilm growth;
   a hydroponic reactor having an inlet and an outlet;
   a filtration device for removing suspended solids;
   means for transferring water exiting the fixed-film reactor outlet to the hydroponic reactor inlet;
   means for channeling water from the hydroponic reactor outlet to the filtration device; and
   means for recycling a portion of the water exiting the filtration device to the fixed-film reactor inlet.

2. The system recited in claim 1, wherein the vessel mixing means comprises at least one of a mechanical mixing device and an aeration device.

3. The system recited in claim 1, wherein the vessel mixing means is adapted to function substantially continuously during system operation.

4. The system recited in claim 1, wherein the hydroponic reactor comprises a basin having an inlet and an outlet, and a rack positionable at a surface of water in the basin for supporting plants thereon.

5. The system recited in claim 4, wherein the basin has a depth no greater than five times a length of roots of the plants growable therein.

6. The system recited in claim 4, wherein the channeling means is operable to permit a water residence time in the hydroponic reactor sufficient to substantially digest volatile suspended solids therein.

7. The system recited in claim 6, wherein water exiting the hydroponic reactor has a yield less than or equal to 0.1, wherein yield is defined as kilograms of effluent volatile suspended solids per kilograms influent biologicalchemical oxygen demand.

8. The system recited in claim 4, wherein the rack covers substantially the entire surface of the basin and, in use, plants cover substantially the entire rack.

9. The system recited in claim 4, further comprising means for mixing water in the hydroponic reactor for facilitating contact between water therein and plant roots.

10. The system recited in claim 9, wherein the hydroponic reactor mixing means comprises at least one of an aerator and a mechanical mixer.

11. The system recited in claim 9, wherein plants in the hydroponic reactor are adapted to retain biofilms on roots for enhancing nutrient removal and for digesting the biofilms.

12. The system recited in claim 1, wherein the filtration device comprises a vertical flow wetland.

13. The system recited in claim 12, wherein the wetland comprises a basin having an outlet in a bottom thereof, the basin adapted to contain a particulate medium, and a mat adapted for permitting plants to root therein, the mat positioned above the particulate medium, the wetland cell adapted to maintain a population of aquatic invertebrates therein.

14. The system recited in claim 1, wherein the recycling means functions to recycle water at a rate between 1 and 10 times a rate of water entering the system.

15. A wastewater treatment system comprising:
   a fixed-film reactor having an inlet for receiving wastewater to be treated and an outlet, the fixed-film reactor comprising a vessel adapted for holding media therein and means for mixing contents of the vessel, the media adapted to support biofilm growth;
   a first and a second hydroponic reactor, each having an inlet and an outlet;
   a filtration device for removing suspended solids;
   means for transferring water exiting the fixed-film reactor outlet to the first hydroponic reactor inlet;
   first means for channeling water from the first hydroponic reactor outlet to the second hydroponic reactor inlet;
   second means for channeling water from the second hydroponic reactor outlet to the filtration device; and
   means for recycling a portion of the water exiting the filtration device to the fixed-film reactor inlet.

16. The system recited in claim 15, wherein the first and the second hydroponic reactor each comprises a basin having an inlet and an outlet, and a rack positionable at a surface of water in the basin for supporting plants thereon.

17. The system recited in claim 16, wherein each of the basins of the first and the second hydroponic reactor has a depth no greater than five times a length of roots of the plants growable therein.

18. The system recited in claim 16, wherein the first and the second channeling means are together operable to permit a total water residence time in the first and the second hydroponic reactors sufficient to substantially digest volatile suspended solids therein.

19. The system recited in claim 18, wherein water exiting the second hydroponic reactor has a yield less than or equal to 0.1, wherein yield is defined as kilograms of effluent volatile suspended solids per kilograms influent biological oxygen demand.

20. The system recited in claim 16, wherein the racks of the first and the second hydroponic reactors each covers substantially the entire surface of the respective basin and, in use, plants cover substantially the entire racks.

21. The system recited in claim 16, further comprising means for mixing water in the first and the second hydroponic reactor for facilitating contact between water therein and plant roots.

22. The system recited in claim 21, wherein plants in the hydroponic reactor are adapted to retain biofilms on roots for enhancing nutrient removal and for digesting the biofilms.

23. The system recited in claim 15, wherein the filtration device comprises a vertical flow wetland.

24. The system recited in claim 23, wherein the wetland comprises a basin having an outlet in a bottom thereof, the basin adapted to contain a particulate medium, and a mat adapted for permitting plants to root therein, the mat positioned above the particulate medium, the wetland cell adapted to maintain a population of aquatic invertebrates therein.

25. The system recited in claim 15, wherein the recycling means functions to recycle water at a rate between 1 and 10 times a rate of water entering the system.

26. A wastewater treatment system comprising:
- a first and a second fixed-film reactor, each having an inlet and an outlet, each fixed-film reactor comprising a vessel adapted for holding media therein and means for mixing contents of the vessel, the media adapted to support biofilm growth;
- a hydroponic reactor having an inlet and an outlet;
- a filtration device for removing suspended solids;
- first means for transferring water to be treated into the first fixed-film reactor inlet;
- second means for transferring water exiting the first fixed-film reactor outlet to the second fixed-film reactor inlet;
- third means for transferring water exiting the second fixed-film reactor outlet to the hydroponic reactor inlet;
- means for channeling water from the hydroponic reactor outlet to the filtration device; and
- means for recycling a portion of the water exiting the filtration device to the fixed-film reactor inlet.

27. The system recited in claim 26, wherein the first fixed-film reactor is adapted to function essentially anoxically and the second fixed-film reactor is adapted to function essentially aerobically.

28. The system recited in claim 26, wherein the vessel mixing means of the first and the second fixed-film reactor each comprises at least one of a mechanical mixing device and an aeration device.

29. The system recited in claim 26, wherein the vessel mixing means of the first and the second fixed-film reactor each is adapted to function substantially continuously during system operation.

30. The system recited in claim 26, wherein the hydroponic reactor comprises a basin having an inlet and an outlet, and a rack positionable at a surface of water in the basin for supporting plants thereon.

31. The system recited in claim 30, wherein the basin has a depth no greater than five times a length of roots of the plants growable therein.

32. The system recited in claim 30, wherein the channeling means is operable to permit a water residence time in the hydroponic reactor sufficient to substantially digest volatile suspended solids therein.

33. The system recited in claim 32, wherein water exiting the hydroponic reactor has a yield less than or equal to 0.1, wherein yield is defined as kilograms of effluent volatile suspended solids per kilograms influent biological oxygen demand.

34. The system recited in claim 30, wherein the rack covers substantially the entire surface of the basin and, in use, plants cover substantially the entire rack.

35. The system recited in claim 30, further comprising means for mixing water in the hydroponic reactor for facilitating contact between water therein and plant roots.

36. The system recited in claim 35, wherein the hydroponic reactor mixing means comprises at least one of an aerator and a mechanical mixer.

37. The system recited in claim 35, wherein plants in the hydroponic reactor are adapted to retain biofilms on roots for enhancing nutrient removal and for digesting the biofilms.

38. The system recited in claim 26, wherein the filtration device comprises a vertical flow wetland.

39. The system recited in claim 38, wherein the wetland comprises a basin having an outlet in a bottom thereof, the basin adapted to contain a particulate medium, and a mat adapted for permitting plants to root therein, the mat positioned above the particulate medium, the wetland cell adapted to maintain a population of aquatic invertebrates therein.

40. The system recited in claim 26, wherein the recycling means functions to recycle water at a rate between 1 and 10 times a rate of water entering the system.

41. A method for treating wastewater comprising the steps of:
- treating wastewater with a fixed-film treatment in an anoxic/aerobic environment;
- treating water containing biofilms sloughed off in the anoxic/aerobic environment with an aerobic aquatic-root-zone treatment sufficient to substantially eliminate yield;
- filtering water emerging from the aerobic treatment to remove any remaining suspended solids; and
- recycling a portion of the filtered water to the anoxic/aerobic environment.

42. The method recited in claim 41, wherein the anoxic/aerobic treating step comprises treating wastewater with a first fixed-film reactor having a substantially anoxic environment and subsequently treating water having been treated in the first fixed-film reactor with a second fixed-film reactor having a substantially aerobic environment.

43. The method recited in claim 42, wherein the recycling step comprises channeling filtered water to the anoxic environment.

44. The method recited in claim 41, wherein the aerobic treating step comprises treating water in a hydroponic reactor.

45. The method recited in claim 41, wherein the recycling step comprises recycling water at a rate between 1 and 10 times a rate of water entering the fixed-film treatment step.

46. A method of designing a site-specific wastewater treatment system, the method comprising the steps of:
- determining parameters of wastewater at a site, the parameters including measured levels of wastewater characteristics and temporal ranges thereof;
- configuring a wastewater treatment system specific to the determined wastewater parameters, the system including:
  - at least one fixed-film reactor having an inlet for receiving wastewater to be treated and an outlet, the fixed-film reactor comprising a vessel adapted for holding media therein and means for mixing contents of the vessel, the media adapted to support biofilm growth;
  - at least one hydroponic reactor having an inlet and an outlet;
  - a filtration device for removing suspended solids;
  - means for transferring water exiting the fixed-film reactor outlet to the hydroponic reactor inlet;
  - means for channeling water from the hydroponic reactor outlet to the filtration device; and
  - means for recycling a portion of the water exiting the filtration device to the fixed-film reactor inlet.

* * * * *